May 12, 1964
H. N. GRILLOT
3,132,459
AUGER SHROUD FOR HAY BALER
Filed May 22, 1962
5 Sheets-Sheet 3
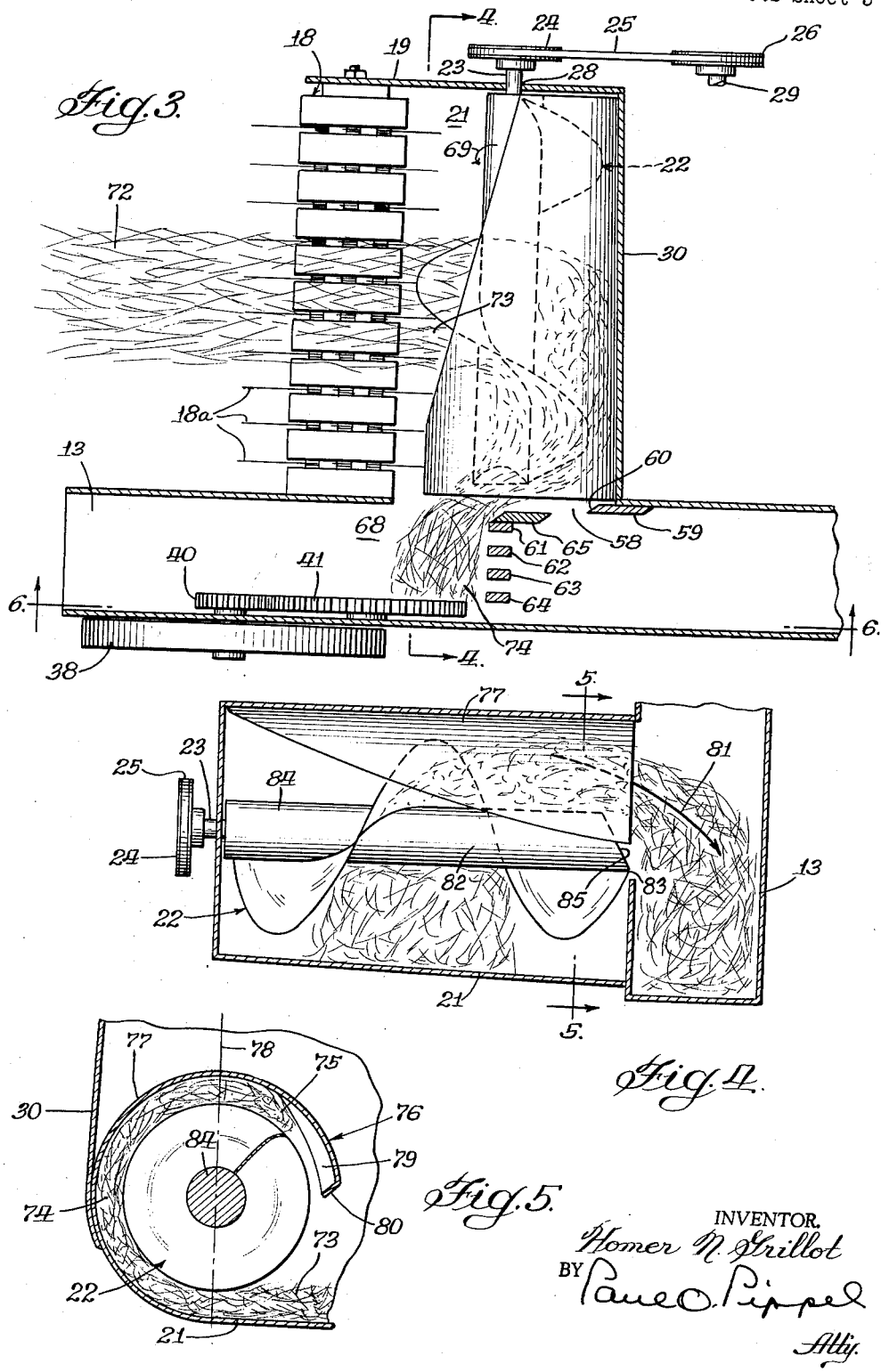

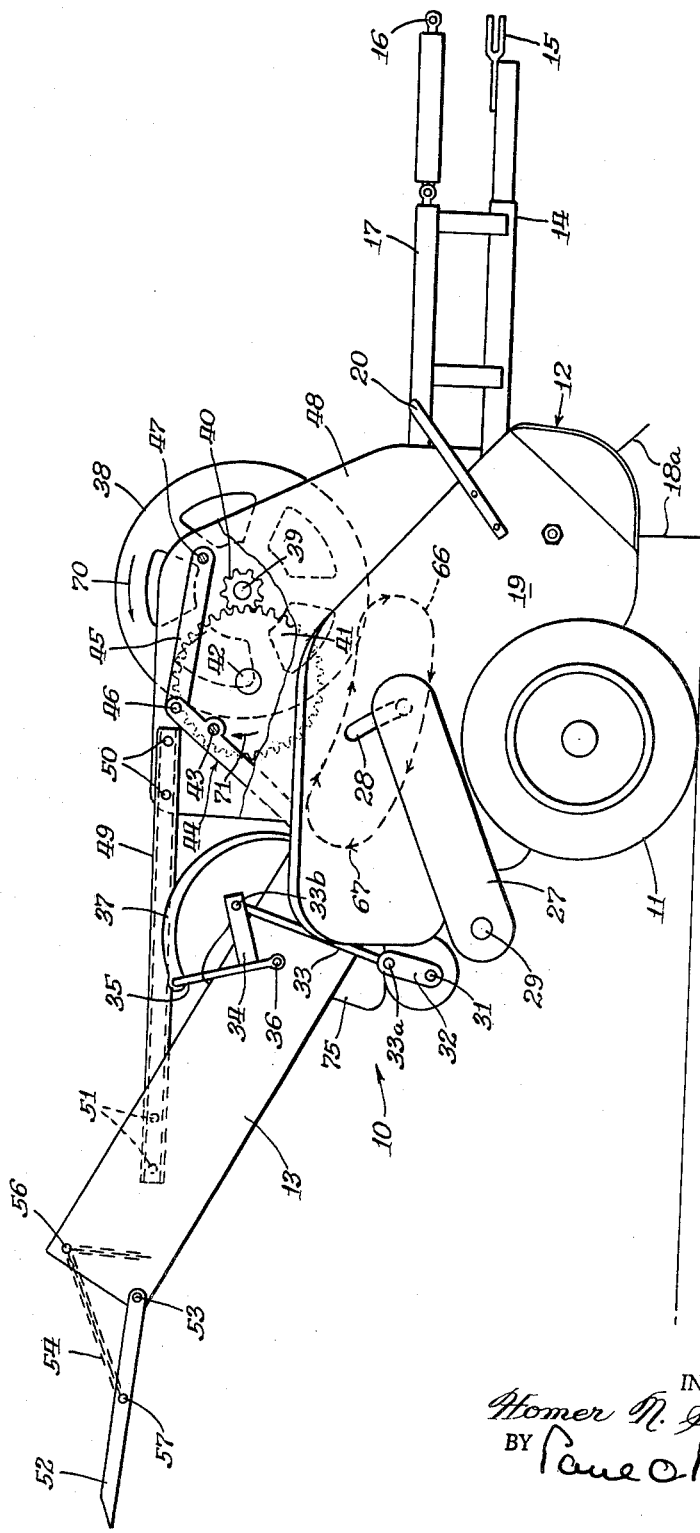

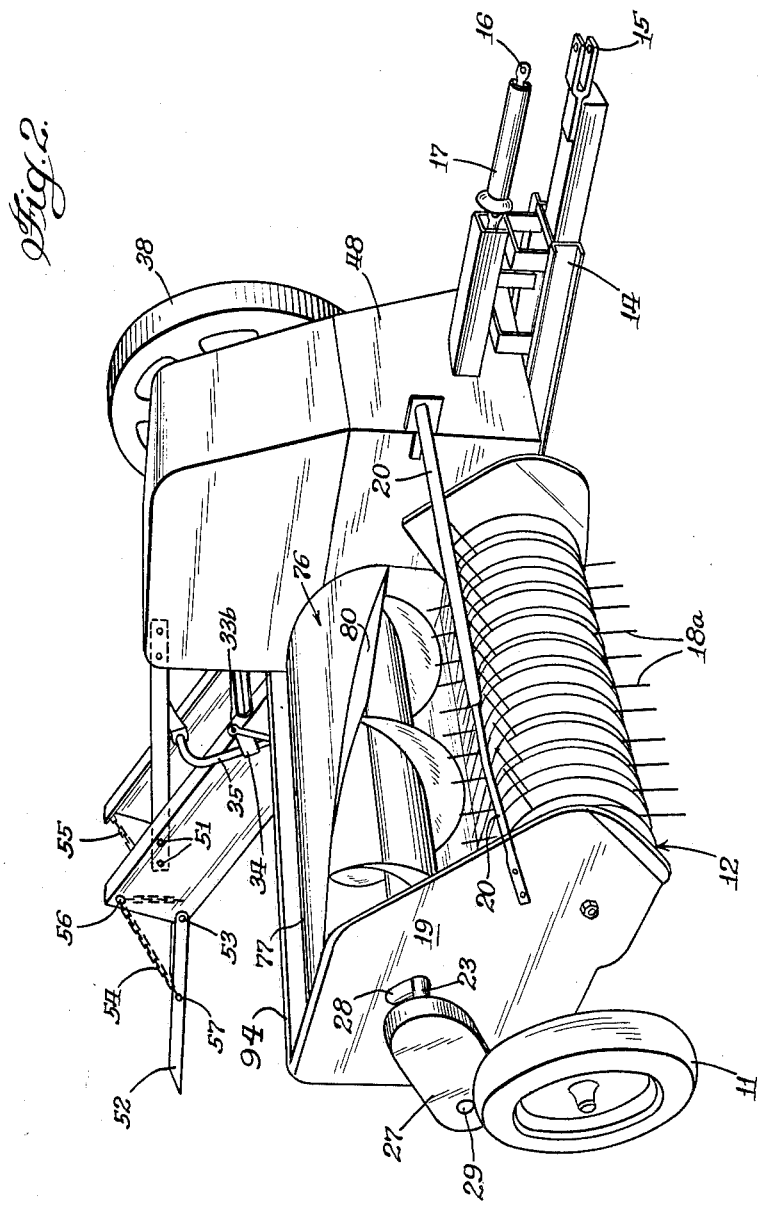

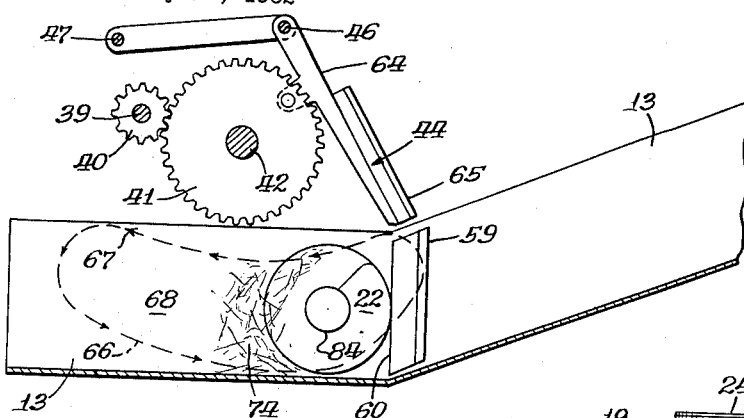
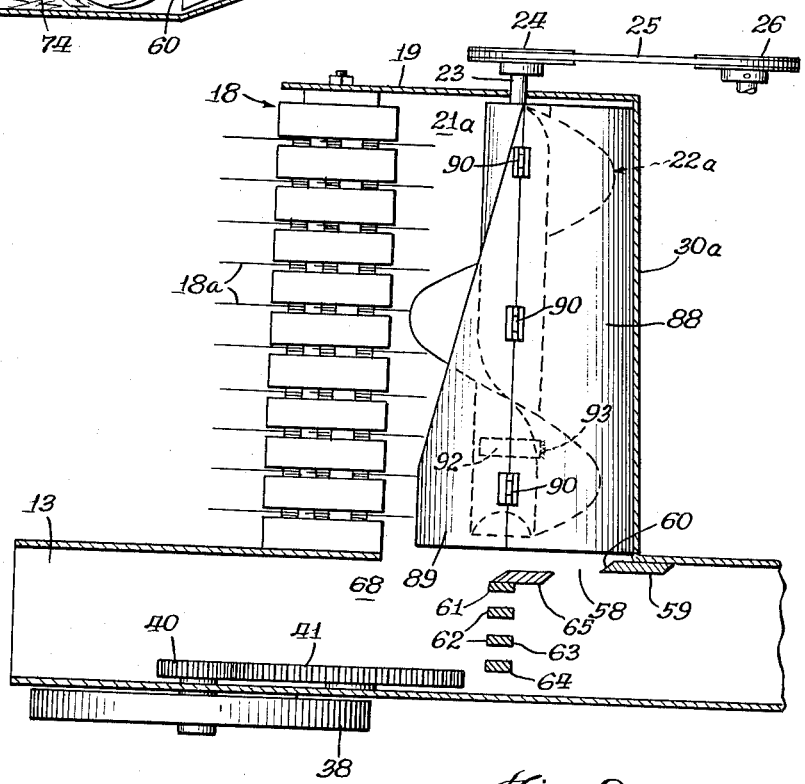
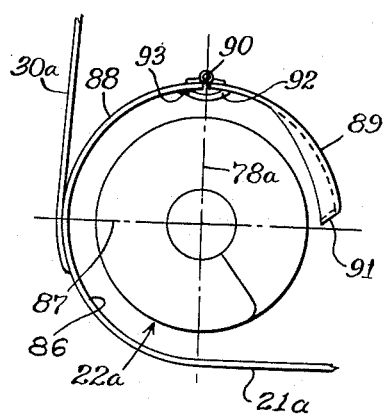

United States Patent Office 3,132,459
Patented May 12, 1964

3,132,459
AUGER SHROUD FOR HAY BALER
Homer N. Grillot, Naperville, Ill., assignor to International Harvester Company, Chicago, Ill., a corporation of New Jersey
Filed May 22, 1962, Ser. No. 196,690
13 Claims. (Cl. 56—341)

This invention relates to a new and improved auger shroud for a hay baler.

Continuous efforts are being made to improve the feeding characteristics of hay into a bale forming chamber. The present invention relates to a hay feeding mechanism having the general overall arrangement as shown in the prior Crumb et al. Patent 2,450,082. The present invention as in the Crumb patent contemplates the precutting of hay and depositing the hay in windrows in the field. The combined pickup and hay compressing machine commonly known as a hay baler traverses this field of windrowed hay and performs the successive functions of picking up the hay from the windrow, depositing the hay on a platform, feeding the hay across the platform by a transversely disposed auger conveyor and delivering the hay into a bale forming chamber. The hay in the Crumb et al. patent was fed generally beneath the floating platform auger and by means of a plurality of oscillating fingers was transported from the end of the auger into and across the bale forming chamber.

It is a principal object of the present invention to utilize a greater portion of the generally cylindrical surface defined by the auger conveyor in feeding hay across a baler platform.

An important object of this invention is to provide means in conjunction with an auger conveyor for causing hay to be fed along the auger, climb upwardly around the back of the auger and thence move over a portion of the top of the auger for discharge at the end of the auger at a substantially high position on the auger conveyor.

An important object of this invention is the provision of a shroud for a transversely disposed auger conveyor for baler platforms in which the shroud at the discharge end of the auger encompasses substantially 270° of the circumference of the auger conveyor.

Another important object of this invention is to supply a shroud for auger conveyors which progressively increases in its coverage of the auger conveyor from substantially 180° coverage at the hay receiving end to substantially 270° at the hay discharge end.

Another and still further important object of this invention is to equip an auger with a hay guiding shroud wherein the hay enters the auger at substantially the bottom thereof and is delivered in approximately a 2 o'clock flight pattern thereby enabling discharge of the hay at a relatively high position for dumping into a cooperating bale forming chamber without auxiliary conveyor mechanisms.

Still another important object of this invention is to provide a shroud for an auger conveyor which is of substantially greater diameter than the diameter of the auger mounted therewithin.

An object as set forth in the preceding paragraph in which the auger is a floating auger and tends to center itself between the top and bottom of the larger diameter shroud.

Another and still further important object of this invention is the provision of a shroud for an auger usable on an agricultural implement to feed fibrous material lengthwise thereof in a substantially spiral path of travel.

A still further important object of this invention is to provide a shroud for operation in conjunction with an auger conveyor in which at least a portion of the shroud encompasses substantially three-quarters of the outer circumference of the auger conveyor and wherein the top quarter of the shroud is hingedly mounted relative to the first two quarters of the shroud thereby being adjustable relative to the remainder of the shroud to control the position of discharge of the fibrous material as it leaves the auger conveyor.

Another important object of this invention is to supply a hay baler with a bale forming chamber extending in a certain direction and having an auger conveyor disposed at right angles thereto for delivering hay to the bale forming chamber.

A still further important object of this invention is a device as set forth in the preceding paragraph in which the auger conveyor has an unjournaled end terminating closely adjacent the bale forming chamber for direct delivery of hay from the auger to the bale forming chamber without auxiliary feeding means.

Another important object of this invention is a device as set forth in the preceding object in which the unjournaled end of the auger conveyor is provided with a tapered nose which acts to relieve or prevent binding of hay between the auger and a means compressing hay within the bale forming chamber.

Still another important object of this invention is to provide a shroud for an auger conveyor which increases in its auger coverage from substantially 180° at the outer end of the auger to substantially 270° at the discharge end of the auger and wherein the shroud is provided with an inwardly projecting flange along the increasing edge thereof to act as a hay stripping element in guiding the hay in its path of travel around the auger and into the bale forming chamber.

Other and further important objects and advantages will become apparent from the disclosures in the following specification and accompanying drawings.

In the drawings:

FIGURE 1 is an end elevational view of a hay baler.

FIGURE 2 is a perspective view of the hay baler of FIGURE 1 incorporating the auger shroud of this invention.

FIGURE 3 is a top plan view partially in section, of a portion of the hay baler shown in FIGURES 1 and 2.

FIGURE 4 is a sectional view taken on the line 4—4 of FIGURE 3.

FIGURE 5 is a sectional view taken on the line 5—5 of FIGURE 4.

FIGURE 6 is a sectional view taken on the line 6—6 of FIGURE 3.

FIGURE 7 is a sectional view similar to FIGURE 5 wherein the discharging portion of the encompassing shroud is hinged for adjustable movement relative to the remaining portion of the shroud.

FIGURE 8 is a top plan view, partially in section of a portion of a baler as in FIGURE 3 and incorporating the modification shown in FIGURE 7.

Figure 9:
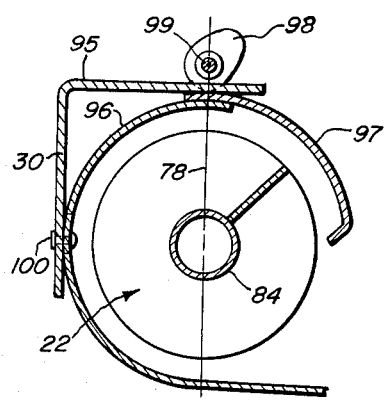
FIGURES 9 and 10 are sectional views, related to the showing of FIGURE 5, but depicting another embodiment of the invention.

The reference numeral 10 indicates generally a hay baler. The hay baler is a machine of the type capable of traversing a field of windrowed hay, harvesting that hay, forming bales, and tying the bales in bale formation. As stated previously, this is the type of machine depicted in the earlier Crumb et al. Patent 2,450,082.

The baler 10 of this invention includes a wheel support 11, a harvesting portion 12 and a bale forming chamber 13. In the present instance the chamber 13 is inclined upwardly and rearwardly so that the loose hay is taken into the chamber at a relatively low position and discharged as condensed hay in tied bales at a relatively high position on the machine. The baler further includes a hitch frame 14 with a clevis 15 at the forward end thereof. The clevis is used to form the attaching means between the baler 10 and a pulling tractor or the like. The tractor or other source of pulling power has not been shown inasmuch as it forms no part of the present invention. A power take-off shaft 16 is adapted to engage a power take-off mechanism on a pulling tractor and deliver rotational drive from the pulling tractor back to the baler operating mechanisms. The shaft 16 is carried within a tubular housing 17 at a position spaced above the frame 14.

The harvesting portion 12 of the baler 10 is provided at its forward end with a hay pickup mechanism having a plurality of transversely spaced-apart spring pickup fingers 18a. The harvesting portion 12 has an end wall 19 which aids in supporting a holddown or top guide 20 for directing hay into the harvesting portion and onto a deck or platform 21 as shown in FIGURE 3. An open end auger conveyor 22 is disposed across the platform deck 21, arranged so that hay fed upwardly over the pickup mechanism 18 will be delivered directly beneath the auger which carries the hay transversely on the platform 21. The hay is thus moved from the harvesting portion 12 to the bale forming chamber 13 at the far side of the baler. The auger 22 is carried on a shaft 23 which has a sheave 24 mounted on its outer end. A V-belt 25 is adapted to impart drive to the sheave 24. A sheave 26 is spaced apart from the sheave 24, but is in planar alignment therewith. Sheave 26 is the drive sheave and imparts movement to the V-belt 25. As shown in FIGURE 1 a housing or cover shield 27 conceals the drive mechanism for the auger 22. An elongated arcuate slot 28 in the end wall 19 permits arcuate swinging movement of the auger and shaft 23 about the pivot shaft 29 of the spaced-apart sheave 26. A similar floating auger mechanism is shown in the prior patent to Crumb et al., 2,450,082. The deck 21 includes a back wall 30 which tapers slightly rearwardly from its juncture with the outer end wall 19 to its juncture with the side of the bale forming chamber 13 as shown in FIGURE 3. The back wall 30 along with a hay guiding shroud to be subsequently described acts to confine the hay fed by the open end auger 22 into the bale forming chamber 13.

A shaft 31 indirectly receives drive from the tractor power take-off through the shaft 16. The shaft 31 shown in FIGURE 1 has a crank 22 mounted thereon for rotational movement about the shaft 31 as a center. A connecting link 33 is pivotally attached to the outer end of the crank arm 32 as shown at 33a. An arm 34 fixedly mounted at one end on a bail-shaped needle arm 35 pivotally receives the upper end of the connecting link 33 at its outer end at 33b. The needle arm 35 is pivotally mounted at 36 on the side of the bale forming chamber 13. Arcuately-shaped needles 37 are carried at an outer portion of the needle arm 35 and act to carry bale encircling strands of either twine or wire around the completed bales as they are moved upwardly and rearwardly through the inclined bale forming chamber 13.

A flywheel 38 is mounted on a shaft 39 which as shown in FIGURES 1 and 6 is journally mounted on the baler. The shaft 39 also carries pinion gears 40. The pinion gears 40 are in meshing engagement with large bull gears 41. The bull gears 41 are mounted on a shaft 42.

A crank 43 is mounted on the bull gears 41 at a position spaced from the center shaft 42. Compressor fingers 44 are pivotally mounted on the crank connection 43 on the bull gears 41. One end of a constraining bar 45 is pivotally mounted at 46 to the upper end of the compressor fingers 44. The constraining bar 45 is pivotally attached at its other end at 47 on a housing 48 which contains driving elements (not shown) to transmit rotational drive from a tractor power take-off through the shaft 16 to the pinion gears 40.

Brace members 49 in the form of channels are shown joining the housing 48 and the upwardly and rearwardly inclined bale forming chamber 13. The brace member 49 is shown fastened at 50 to the housing 48 and at 51 to the inclined bale forming chamber 13.

A bale discharge pan 52 is hingedly mounted at 53 on the upper rearward end of the chamber 13. The discharge pan 52 may be adjusted to any desired angle of bale discharge by shortening or lengthening side holding chains 54 and 55 which extend between the pan and the side walls of the chamber 13. One end of each chain is anchored at 56 on the bale forming chamber 13 and the other end of each chain is anchored at 57 to the pan 52. Thus if it is desired to discharge the bales to the ground the pan 52 is inclined downwardly for an easy drop of the bales, or if the bales are to be discharged onto the bed of a wagon or a truck the pan 52 may be adjusted as shown in FIGURE 1 so that the bales may slide off directly onto the wagon bed.

As best shown in FIGURE 3, the bale forming chamber 13 has a side opening 58 through which material to be baled is delivered through the chamber 13. The unjournaled or open end of the auger 22 is located directly opposite the opening 58. The rearward edge of the side opening 58 is provided with a generally vertically disposed stationary knife 59 having a forwardly disposed shear edge 60 so that hay fed rearwardly and upwardly in the inclined bale forming chamber 13 will have to pass the stationary shear knife.

The plurality of compressor fingers 44, as shown in FIGURES 3 and 6, includes spaced-apart fingers 61, 62, 63, and 64. The compressor fingers have been identified as a unit by the numeral 44. The innermost fingers 61 is provided with a generally vertically disposed knife element 65 thereon. The baler of this invention employs the plurality of oscillating compressor fingers to compress hay within the bale forming chamber in lieu of a reciprocating plunger which is usually employed to accomplish bale compression. The relative width of the compressor fingers is substantially small compared to the extent of the side opening 58 in the bale forming chamber 13. Thus there is no time when the opening 58 is completely closed to the admission of more hay.

The rearward motion of the compressor fingers 44 through the bale forming chamber 13 causes the fingers to pass the opening 58 and to pick up hay and move it rearwardly into the upwardly and rearwardly inclined portion of the chamber 13. The forwardly disposed knife edge 60 of the stationary knife 59 is arranged to cooperate with the knife 65 to effect a shearing of hay fed therepast. This causes a separation of the charges of hay which are fed to the bale chamber 13. Of course, this shearing also acts to permit ready separation of hay after the strands of a completed bale are cut and avoids entanglement of one bale with a succeeding bale.

The path of movement of the compressor fingers is shown at 66 in both FIGURES 1 and 6 and the arrows 67 indicate the direction of movement. It will be noted that as the fingers move forwardly they are substantially in an up position out of the bale forming chamber 13 and then at the extreme forward end of their travel the fingers move downwardly through an area 68 defined as a preliminary hay storage area in the bale forming chamber 13 located forwardly of the side opening 58. Thus the compressor fingers act to clean out or empty the storage area 68 on each cycle of movement of the compressor fingers through this kidney-shaped path of travel 66 as shown in FIGURE 6. This preliminary storage area permits constant feeding of hay into the chamber 13 even though the compressor fingers 44 are moving rearwardly on their compression stroke and causing hay to be formed into bales.

As shown in FIGURE 3, the direction of rotation of the auger 22 is indicated by the arrow 69. The auger turns over forwardly and envelops hay feed thereto for lateral delivery through the open end thereof toward the forward edge of the side opening 58 in the bale forming chamber 13. Of course, in the operation of the baler hay may be discharged across the entire open end of the auger 22 for delivery throughout substantially the full width of the opening 58 in the chamber 13. The longitudinal extent of the plural packer or compressor fingers 44 is so small relative to the longitudinal extent of the opening 58 that entrance of hay into the opening 58 is not completely blocked at any time. In other words, the hay may be delivered to a position rearwardly of the plural compressor fingers whereupon the fingers move the hay directly past the cooperating shear knives 59 and 65 and into bale formation in the end of the upwardly and rearwardly inclined chamber 13 on the rear of the side opening 58. Or, the hay may be delivered to the bale forming chamber through the side opening 58 on the other side thereof forwardly of the compressor fingers to the preliminary storage chamber 68 in a relatively horizontally disposed portion of the bale forming chamber for subsequent picking up and delivery rearwardly into the upwardly and rearwardly inclined bale forming portion of the chamber 13.

As best shown in FIGURE 1, the flywheel 38 is rotated in the direction of the arrow 70 whereas the bull gears 41 are rotated in opposite directions as shown by the arrow 71. Movement of the compressor fingers 44 is occasioned by their direct attachment to the bull gears 41 through the crank 43 thus insuring movement of the compressor fingers along the kidney-shaped path 66 in the direction of the arrows 67.

The present invention is concerned with the path of travel of the hay through and around the auger 22 for discharge into the bale forming chamber 13. FIGURE 3 shows the hay in windrows 72. The hay then moves upwardly over the pickup cylinder 18 by reason of the spring fingers 18a and is deposited onto the platform or deck 21 of the harvesting portion 12 of this machine. As shown in FIGURES 3, 4, and 5 the hay from the windrows 72 now designated by the numeral 73 on top of the deck 21 is fed beneath the auger 22. The platform auger 22 as previously stated is unjournaled at its discharge end adjacent the side opening 58 is the bale forming chamber 13. The hay now designated by the number 74 passes upwardly around the back side of the auger 22 and thence over the top of the auger as shown at 75 for discharge at a high point on the auger so that it may be dropped or dumped into the bale forming chamber 13 through the unjournaled end of the auger terminating closely adjacent the side opening 58 in the bale forming chamber. The movement of the hay beneath the auger, up the back side and over the top in a spiral path substantially duplicating movement around a clock face from the bottom or 6 o'clock position for discharge at substantially 2 o'clock is for convenience designated a 2 o'clock flight pattern for hay travel through the auger.

The means for accomplishing the 2 o'clock flight pattern of hay through the auger 22 is a shroud 76. As best shown in FIGURE 5, the shroud 76 and the back wall 30 of the platform merge with the substantially horizontally disposed deck 21 and thereupon progress upwardly and rearwardly in an arcuate path substantially concentric to the auger 22 disposed therewith. In FIGURE 5, also, it is clear how the hay 73 passes under the auger 22 and thereupon moves upwardly around the arcuate path between the auger and the combination back wall and shroud as shown at 74. The next quarter of the shroud 76 shown at 77 in FIGURE 5 extends from the point of separation of the shroud 76 from the back wall 30 and up to the top or vertical center line 78 of the auger 22. Thus the extent of the shoud 76 at the outer or driving end of the auger 22 constitutes a semi-circular cover approximating 180° in extent. The hay is thus confined between the auger and the shroud through a path of 180° from the deck 21 up to the vertical center line 78 of the auger at the top thereof. As best shown in FIGURE 3, the shroud 76 increases in arcuate extent gradually from the outer end of the auger 22 to the discharge end of the auger 22. The extent of increase is approximately another quarter turn or 90° of arcuate coverage, as shown in FIGURES 3 and 5. This gradually increasing segment disclosed at 79 is equipped with an inwardly turned flange or ledge 80 at its lower edge. This, of course, confines the path of travel of the hay and directs it into this 2 o'clock flight pattern. As best shown in FIGURE 4, the hay moves in a trajectory from a high discharge on the auger 22 through the side opening 58 of the bale forming chamber 13 so that it is substantially dumped as indicated by the elongated arrow 81. The reason for the increasing size of the shroud becomes readily apparent when it is understood that the hay from the windrows 72 passes beneath the auger and thereupon moves in a spiral path up the back side and thence over the top of the auger for discharge into the bale forming chamber. At the outer end of the auger 22 there is no need to have the shroud extend around the front side of the auger inasmuch as it might impede movement of incoming hay onto the platform 21. However, as the hay travels beneath, up the back, and thence over the top of the auger there is a necessity for guiding the hay at the discharge end so that it will not merely circle the auger and drop back onto the pickup cylinder. It is this gradually increasing portion 79 of the shroud 76 that guides the hay into the bale forming chamber 13. The lower flanged edge 80 of the portion 79 insures stripping of the hay from the auger and avoids winding of hay on the auger. Hay moves from the stripping flange 80 for delivery through and across the opening 58 in the side wall of the bale forming chamber.

Because the auger 22 is capable of floating movement it tends to automatically substantially center itself between the bottom and top of the encompassing shroud 76 so that an even or uniform amount of hay is fed around the auger. This automatic centering of the floating auger within the enlarged diameter generally cylindrical shroud which surrounds the auger facilitates an even and uniform delivery of hay to the bale forming chamber and thus enhances the uniformity of the bales being formed.

As best shown in FIGURE 4, the unjournaled or nose end 82 of the auger is tapered to an apex 83 at one side of the enlarged core 84 of the auger 22. A cutoff or relieved portion 85 on the end of the auger core 84 adjacent the apex 83 prevents binding of hay between the auger and the compressor fingers 44 as they move past the closely adjacent discharge end of the auger 22.

In the operation of the device of this invention hay is picked up by the cylinder from the windrows 72 and deposited onto the platform deck 21 whereupon it moves beneath the auger 22 as shown at 73 and thence moves upwardly around the arcuate backside of the combined back wall and shroud 76 as shown at 74. Thereafter the hay continues its spiral movement through the auger as shown at 75 whereupon it is guided by the gradually increasing shroud 76 by its third quarter covering 79. With the aid of the flanged ledge 80 the hay is discharged for movement through the trajectory 81 into the bale forming chamber 13. By reason of the floating auger operating within predetermined limits of bottom and top of the encompassing cylindrical shroud 76 the auger is naturally centered therebetween by the hay being fed by the auger. There is thus accomplished a uniform and even flow of hay through this 2 o'clock flight pattern into the bale forming chamber 13 substantially across the full depth thereof so that the packer fingers 44 may effect a compressing of a substantially uniformly dense bale. The offset relieving of the nose as shown at 85 on the discharge end of the auger 22 prevents any binding whatsoever between the hay being compressed by the packer fingers 44 and the hay being discharged from the auger 22.

Another embodiment of the invention is shown in FIG-

URES 7 and 8. The modified shroud is made somewhat differently. For convenience, certain parts of the modification shall be designated by the same reference numerals as used in FIGURES 1–6 but with the addition of the suffix "a." For example, the deck is designated 21a, the auger 22a, the back wall 30a, and the center line 78a. The first quarter segment of the shroud is shown at 86 and as in the device of FIGURE 5 merges with the horizontally disposed deck 21a up to a substantially horizontally disposed center line 87 of the auger 22a. The second quarter segment of shroud shown at 88 continues from the horizontal center line 87 up to the vertical center line 78a at the top thereof. The third quarter segment 89 of the auger shroud is pivotally fastened at 90 to the fixed portion 88 of the shroud. The segment 89 with its downward and inwardly turned bottom flange 91 is free to float upwardly away from the auger 22a to thereupon accommodate varying quantities of hay being fed to the bale forming chamber. A stop 92 is affixed at 93 to the stationary portion 88 of the shroud and limits downward movement of the segment 89 of the shroud so that it cannot fall inwardly against the auger 22a. As shown in FIGURE 8 the hinge between the shroud parts is disposed substantially along the top axis 78a of the auger 22a and thus provides for convenient outward and upward swinging of the movable segment 89 to thereupon permit greater or lesser quantities of hay to be fed to the bale forming chamber 13.

The baler of this embodiment of the invention thus contemplates the confining and/or guiding of hay across a transversely disposed platform 21 by means of a floating auger disposed within a larger diameter cylindrically shaped shroud which increases in size from substantially a 180° enclosure to a substantially 270° enclosure. The resultant path of travel through the auger is in a spiral fashion causing a dumping of the hay at approximately a 2 o'clock position in a flight pattern such that the hay is delivered into the bale forming chamber for subsequent compression by oscillating fingers 44. It is evident that both the shrouds of FIGURES 5 and 7 perform in the same manner but for the hinged third quarter section of the device as shown in FIGURE 7 which is additionally capable of accommodating various quantities of hay. The fixed shroud of FIGURE 5 is designed generally for a normal supply of hay being fed thereto.

In certain crop conditions a normal supply of hay may not be provided to the baler, and in such instances it may be desirable to adjust the position of the shroud. More specifically, when very small windrows are being handled, or material which is only augered with difficulty is encountered, it may be desirable to regulate the dimensions of the material feeding channel by decreasing the spacing between the shroud and the auger flight, as made possible by the embodiment shown in FIGURES 9–11.

Prior to considering the embodiment of FIGURE 9, reference is made to the construction of the baler illustrated in the drawings in which the back wall is referenced by numeral 30, and in FIGURE 2, the top of this back wall is identified by number 94. In actual baler constructions, a horizontal metal bracing sheet extends forwardly from the top 94 of the back wall over shroud 76, to provide additional rigidity and strength over the platform and auger areas of the baler. To more clearly illustrate the inventive structure, such a structural reinforcing member has been omitted from the showing of FIGURES 1–8, inasmuch as the bracing member is well known in the art and does not contribute to an understanding of the invention. However, in the embodiment of FIGURES 9–11, back wall 30 is depicted as having a forwardly extending portion 95 disposed substantially horizontally, and portion 95 may function as the bracing or reinforcing member conventionally utilized for this purpose. As illustrated in FIGURE 9, platform 21 is curved upwardly and rearwardly and terminates in an arcuate portion 96, which extends substantially in a semi-circle from the lower horizontal portion of the platform upwardly just beyond center line 78. In accordance with the inventive teaching, another shroud segment 97 is provided in the position illustrated to cooperate with shroud portion 96 at the rear of the platform in forming a shroud assembly which is adjustable to vary the clearance between such shroud assembly and the screwflight on auger 22.

Figure 10:
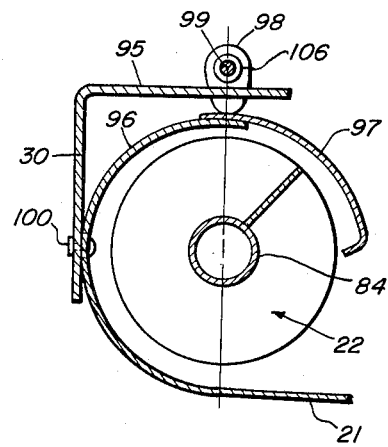

To effect such adjustment, at least one eccentric or cam unit 98 is supported to pivot about an axis 99, and such conventional support may include a shaft (as will be described in connection with FIGURE 11) positioned over top wall 95. In order to effectively distribute the adjusting force, the wall or bracing member 95 is apertured to permit each cam 98 to pass therethrough and engage shroud segment 97. To accommodate movement of the shroud portions during adjustment, a bolt or rivet 100 passes through an elongated aperture in shroud portion 96, and through back wall 30, thereby securing shroud portion 96 against the back wall but permitting relative movement in a plane substantially parallel to plane of back wall 30 when cam 98 is moved. In like manner, corresponding rivet connections are made through top wall 95 and through each of shroud portions 97 and 96, but such connections are omitted to facilitate the illustration of cams 98. In the position of the inventive structure depicted in FIGURE 9, clearance between the outer portion of the auger and the inner portions of shroud segments 96 and 97 is almost the maximum obtainable. FIGURE 10 illustrates the reduction of this clearance space as cam 98 is displaced through approximately 135° to minimize the clearance spacing between the shroud segments and the periphery of the flight on the auger. Accordingly, shroud segments 96 and 97 may be collectively considered an adjustable shroud unit or assembly, movable with respect to a reference or supporting member, such as wall 95, to effect the desired clearance over the auger.

Figure 11:
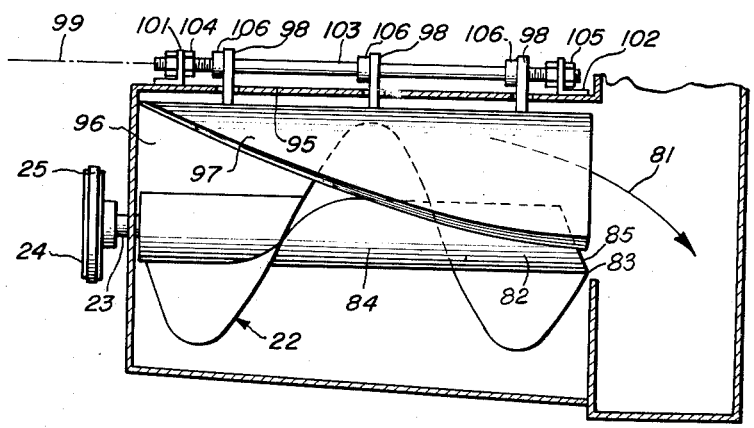
FIGURE 11 is a sectional view, related to that of FIGURE 4, illustrating the embodiment of FIGURES 9 and 10.

FIGURE 11 illustrates one form of support and adjusting arrangement for the plurality of eccentrics 98. As there indicated, a pair of angle or support brackets 101 and 102 are affixed at opposite extremities of the top wall 95. These brackets provide support for a shaft 103 which is substantially square in cross section, the position of which is secured by a pair of adjusting nuts 104 and 105 positioned adjacent the brackets 101 and 102, respectively. A plurality of collars 106 are individually affixed to the respective cams or eccentrics 98, with each collar defining an approximately square opening therein which fits snugly over shaft 103. Accordingly, upon loosening of nuts 104 and 105, a wrench or other aligning tool can be placed on shaft 103 and the shaft rotated to secure the desired position of eccentrics 98. In this manner the positions of the shroud segments 96 and 97 are simply and rapidly adjusted to provide the desired clearance between the movable shroud assembly comprised of the segments and the outer periphery of the flight on the auger.

While only particular embodiments of the invention have been described and illustrated, it is apparent that modifications and alterations may be made therein. It is therefore the intention in the appended claims to cover all such modifications and alterations as may fall within the true spirit and scope of the invention.

What is claimed is:

1. A baler comprising a hay pickup, a deck to receive hay from the hay pickup, an auger disposed over said hay receiving deck, said auger being journally supported at its outer end and unjournaled at its discharge end, a bale-forming chamber disposed generally at a right angle to said deck, said bale-forming chamber having a side opening located adjacent the unjournaled discharge end of said auger, and means associated with said auger for causing said hay to feed in a generally spiral path about said auger for delivery into said bale-forming chamber through said opening, said means including a shroud of a generally cylindrical shape and of larger diameter than said auger.

2. A baler comprising a hay pickup, a deck to receive hay from the hay pickup, an auger disposed over said hay receiving deck, said auger being journally supported at its outer end and unjournaled at its discharge end, a bale-forming chamber disposed generally at a right angle to said deck, said bale-forming chamber having a side opening located adjacent the unjournaled discharge end of said auger, and means associated with said auger for causing hay to feed in a generally spiral path about said auger for delivery into said bale-forming chamber through said opening, said means including a shroud extending partially around said auger and having a circumference of substantially 180° at the outer end of said auger and a circumference of substantially 270° at the discharge end of said auger.

3. A baler comprising a hay pickup, a deck to receive hay from said pickup, an auger disposed over said hay receiving deck, said auger being journally supported at its outer end and unjournaled at its discharge end, a bale-forming chamber disposed generally at a right angle to said deck, said bale-forming chamber having a side opening located adjacent the unjournaled end of said auger, means in said bale-forming chamber for compressing hay therein past said opening, said auger having a relatively large diameter core, said core being truncated at its discharge end adjacent said side opening to prevent wedging of hay between said auger and said hay compressing means, and shroud means partially surrounding said auger for retaining hay about said auger and guiding said hay in a relatively 2 o'clock flight pattern into said side opening.

4. A hay feeding mechanism for a hay baler having a baling chamber with a hay inlet, comprising: an auger for feeding hay to said baling chamber through said hay inlet, and a shroud for retaining hay around the screw of said auger, said shroud extending longitudinally of said auger and being closely spaced thereabout to form a C-shaped cross section, said shroud extending under said auger from a point below and to one side of said auger, upwardly along the opposite side of said auger, over the top of said auger, and down said one side of said auger, to form a hay inlet into said shroud, and means for adjusting the position of said shroud with respect to said auger, whereby hay is retained around the thread of said auger and said auger feeds a greater quantity of hay to said baling chamber.

5. The hay feeding mechanism of claim 4, wherein said shroud extends down said one side of said auger to a point adjacent the horizontal centerline of said auger.

6. The hay feeding mechanism of claim 5, wherein a stripper flange projects from the end of said downwardly extending portion of said shroud toward said auger.

7. The hay feeding mechanism of claim 4, wherein said hay inlet for said baling chamber is in the upper portion thereof.

8. A hay feeding mechanism for a hay baler having a baling chamber with a hay inlet, comprising: an auger normal to said hay inlet for feeding hay to said baling chamber through said hay inlet, a shroud for retaining hay around the screw of said auger, said shroud substantially enclosing said auger and being closely spaced thereto, said shroud including an upright semi-cylindrical portion curved around said auger and forming the back side of said shroud, a plane portion extending under said auger in a forwardly direction from the lower end of said upright semi-cylindrical portion, a curved portion extending forwardly and downwardly from the upper end of said upright semi-cylindrical portion and terminating at a point adjacent the horizontal centerline of said auger, to form with said plane portion a hay inlet into said shroud, whereby hay is retained around the thread of said auger and a greater portion of the surface of said auger is used to feed hay to said baling chamber.

9. A hay feeding mechanism for a hay baler having a baling chamber with a hay inlet, comprising: an auger for feeding hay to said baling chamber through said hay inlet, a shroud for retaining hay around the screw of said auger, said shroud substantially enclosing said auger and being closely spaced thereto, said shroud having a hay inlet in the lower portion of one face thereof, said hay inlet having a substantially linear lower edge and a rearwardly spirally upper edge.

10. The hay feeding mechanism of claim 4, including means for adjusting the position of said shroud with respect to said auger, said last named means comprising a support wall adjacent said shroud, means slidably connecting said shroud to said support wall, and rotatable eccentric means mounted on said support wall and slidably engaging said shroud.

11. A baler as set forth in claim 8 in which said curved portion of said shroud has an inwardly turned hay stripping flange along its terminal edge.

12. A baler as set forth in claim 4 in which the discharge end of said auger is truncated.

13. In a hay baler, an auger having a core and a screw-flight thereon, disposed to move the hay from an input location to an output location, a shroud assembly movably positioned adjacent said auger to define a material feeding channel between the auger screwflight and the shroud, and adjusting means, supported for engagement with said shroud, for regulating the position of said shroud and thereby correspondingly regulating the extent of the material feeding channel to accommodate the baler to different crop conditions.

References Cited in the file of this patent

UNITED STATES PATENTS

| | | |
|---|---|---|
| 2,450,082 | Crumb et al. | Sept. 28, 1948 |
| 2,571,489 | Russell | Oct. 16, 1951 |
| 2,757,602 | Nolt | Aug. 7, 1956 |
| 2,842,045 | Bornzin | July 8, 1958 |